(12) United States Patent
Schlafly

(10) Patent No.: US 7,516,491 B1
(45) Date of Patent: Apr. 7, 2009

(54) LICENSE TRACKING SYSTEM

(76) Inventor: Roger Schlafly, P.O. Box 67234, Scotts Valley, CA (US) 95067

( * ) Notice: Subject to any disclaimer, the term of this patent is extended or adjusted under 35 U.S.C. 154(b) by 891 days.

(21) Appl. No.: 10/405,153

(22) Filed: Apr. 2, 2003

Related U.S. Application Data

(63) Continuation-in-part of application No. 10/273,924, filed on Oct. 17, 2002.

(51) Int. Cl.
*H04K 1/00* (2006.01)
*G06F 7/04* (2006.01)
*G06F 17/30* (2006.01)
*H04L 9/00* (2006.01)

(52) U.S. Cl. .................... 726/26; 713/155; 705/64; 380/282

(58) Field of Classification Search ............ 380/282; 713/155; 705/64
See application file for complete search history.

(56) References Cited

U.S. PATENT DOCUMENTS

| | | | | |
|---|---|---|---|---|
| 5,208,853 | A * | 5/1993 | Armbruster et al. .......... 705/56 |
| 5,513,245 | A * | 4/1996 | Mizikovsky et al. ........ 455/411 |
| 5,794,139 | A * | 8/1998 | Mizikovsky et al. ........ 455/403 |
| 6,327,652 | B1 | 12/2001 | England et al. |
| 6,330,670 | B1 * | 12/2001 | England et al. ............... 713/2 |
| 6,385,596 | B1 | 5/2002 | Wiser et al. |
| 6,427,140 | B1 | 7/2002 | Ginter et al. |
| 6,445,797 | B1 | 9/2002 | McGough |
| 6,477,252 | B1 * | 11/2002 | Faber et al. ................. 380/200 |
| 6,651,171 | B1 * | 11/2003 | England et al. ............ 713/193 |
| 6,691,149 | B1 * | 2/2004 | Yokota et al. .............. 709/201 |
| 6,766,353 | B1 * | 7/2004 | Lin et al. .................. 709/203 |
| 6,775,655 | B1 * | 8/2004 | Peinado et al. .............. 705/59 |
| 6,775,779 | B1 * | 8/2004 | England et al. .............. 726/26 |
| 6,792,539 | B1 * | 9/2004 | Oishi et al. ................. 713/194 |
| 7,036,011 | B2 * | 4/2006 | Grimes et al. .............. 713/156 |
| 7,036,020 | B2 * | 4/2006 | Thibadeau .................. 713/193 |
| 7,095,852 | B2 * | 8/2006 | Wack et al. ................... 380/44 |
| 7,137,004 | B2 * | 11/2006 | England et al. ............ 713/176 |
| 7,152,165 | B1 * | 12/2006 | Maheshwari et al. ........ 713/193 |
| 7,278,016 | B1 * | 10/2007 | Detrick et al. ................ 713/2 |
| 2001/0042043 | A1 * | 11/2001 | Shear et al. ................. 705/51 |
| 2002/0006204 | A1 | 1/2002 | England et al. |
| 2002/0007456 | A1 * | 1/2002 | Peinado et al. ............. 713/164 |
| 2002/0107803 | A1 * | 8/2002 | Lisanke et al. ............... 705/51 |
| 2002/0173295 | A1 * | 11/2002 | Nykanen et al. ............ 455/414 |

(Continued)

OTHER PUBLICATIONS

Housley et al, "Internet X.509 Public Key Infrastructure Certificate and CRL Profile", Jan. 1999, RFC 2459, pp. 1-121.*

(Continued)

*Primary Examiner*—Christopher J Brown

(57) ABSTRACT

A method and system for remotely maintaining data that is critical for license enforcement. The data consists of named values, is kept on a user's trusted platform, and encrypted with the use of keys that are stored in two special registers. One register is exclusively readable by a trusted program, and holds a long-term secret. Another register is exclusively writable, and changed often, so that old backups of the named values can only be read if suitable permissions are obtained. It uses a hierarchy of servers that act as vendors and have contractual obligations. Vendor certificates specify that certain named values are stored on users' trusted platforms, but owned and controlled by servers (with the cooperation of the users).

11 Claims, 5 Drawing Sheets

U.S. PATENT DOCUMENTS

| | | | |
|---|---|---|---|
| 2003/0007646 A1* | 1/2003 | Hurst et al. | 380/285 |
| 2003/0041221 A1* | 2/2003 | Okada | 711/164 |
| 2003/0097558 A1* | 5/2003 | England et al. | 713/155 |
| 2003/0097579 A1* | 5/2003 | England et al. | 713/193 |
| 2003/0105720 A1* | 6/2003 | Ishibashi | 705/52 |
| 2003/0233553 A1* | 12/2003 | Parks et al. | 713/178 |
| 2004/0003251 A1* | 1/2004 | Narin et al. | 713/172 |

OTHER PUBLICATIONS

IETF RFC 2459. [retrieved on Feb. 26, 2007]. Retrieved from the internet:<URL:://www.ietf.org/rfc/rfc2459.txt>.

Digital Certificates—Applied Internet Security, by Feghii, Feghii, and Williams, Addison-Wesley, 1999.

Trusted Computing Platforms: TCPA Technology in Context, edited by Siani Pearson (Hewlett-Packard Books and Prentice-Hall, Jul. 2002).

* cited by examiner

LICENSE TRACKING SYSTEM

REFERENCES

This is a continuation-in-part of U.S. patent application Ser. No. 10/273,924, titled "Secure Transaction Processor", and filed Oct. 17, 2002.

BACKGROUND

This invention relates to computer security, and more particularly, to ways of remotely controlling and authenticating computer data.

Many methods of secure communication between computers are well-known. Algorithms for encryption, authentication, random number generation, and related functions are described in U.S. National Institute for Technology Federal Information Processing Standards, and in other commonly available standards and publications. Some of the algorithms are the secure hashing algorithm (SHA-1), the advanced encryption standard (AES), and the digital signature algorithm (DSA). Some of the best methods are resistant to adaptive chosen ciphertext attacks by hostile intruders with enormous computer resources.

The Public Key Infrastructure (PKI) is a way of managing identifying credentials in a computer network. Each entity typically has a certificate with its name and public key signed by a certificate authority (CA). Certificates can be validated by checking signatures against root certificates, and also by checking lists of revoked certificates. X.509 certificates bind a distinguished name to a public key, for a given time interval, possibly with some constraints. X.509 certificates, and how they are used in a PKI, are described in IETF RFC 2459 and in the book Digital Certificates—Applied Internet Security, by Feghii, Feghii, and Williams. Addison-Wesley, 1999. A PKI can use RSA, DH/DSA, ECC or other public key algorithms.

Truly secure operating systems are difficult with current technology. Most computers today are susceptible to viruses and other problems. To reduce those problems, computers are being developed with trusted components. The trusted hardware might be the motherboard, cryptographic unit, keyboard, mouse, and a video display mode, so that the user can reliably have some tamper-resistant input and output. It might also include other peripherals. The trusted software is a trusted kernel that is a highly reliable part of the operating system. When the trusted kernel starts up, it verifies various hashes or certificates, and it is capable of attestation that a program is running in an environment with specified security properties. The attestation can take the form of hashes and certificates that can be validated elsewhere. A combination of hardware and software features may also protect certain program operations from interference by other programs, and provide sealed storage for programs running in the trusted environment. The Trusted Computing Platform Alliance (TCPA) issues specifications for trusted computing platforms, and their effort is described in the book Trusted Computing Platforms: TCPA Technology in Context, edited by Siani Pearson (Hewlett-Packard Books and Prentice-Hall, July 2002). U.S. Pat. Nos. 6,327,652 and 6,330,670 describe a digital rights management operating system that could act as a trusted platform. Other approaches may also be possible.

Secure distribution of electronic content presents some unusual challenges. In particular it is difficult to buy just one copy of a digital file because files are copied so easily on computers. Some digital rights management systems are described in U.S. Pat. Nos. 6,385,596, 6,427,140, and 6,445,797, and in US patent application 20020006204.

Many content distributors use some sort of technological copy protection scheme in order to help enforce license terms. Often it involves hiding special information, such as dates, serial numbers, cryptographic keys, usage counts, or other codes, on a disk in the consumer's own equipment. Another technique is to put the special information in a chip on a smart card or dongle that attaches to the device that is using the protected content.

These license enforcement mechanisms are subject to reverse engineering and other attacks. There is a need for a system of reliably and acceptably maintaining provider information on a consumer device, even in the face of consumer attacks.

One problem with licensors storing hidden codes on user equipment is that the codes are subject to accidental loss when there is a hardware failure, user mistake, virus attack, or unexpected conflict. Eg, the codes could be stored on a disk drive and the disk could fail. Users usually prefer to back up vital data to another medium, so as to guard against a loss. But if the user is allowed to back up the licensor codes, then he might be able to restore the licensor codes to another machine, or otherwise violate the license. Even restoring the codes to the same machine might lead to a violation because one of the codes might be a usage counter. Restoring a previous value of a usage counter might result in unlicensed usage because any usage between when the counter was backed up and restored would no longer be counted.

There is a need for a system that allows licensor codes to be backed up, but imposes conditions on restoration in order to thwart abuse.

The license requirements of content providers change over time. Vulnerabilities get exposed and exploited. There is a need for systems that are extensible and can be upgraded in the field.

Consumers want a system that is understandable, fair, voluntary, and respectful of privacy. There is a need for such a system. There is a need for a technological system that provides improved tools for effectively tracking and enforcing licenses on users. There is also a need for users to understand how their computers are being constrained.

BRIEF SUMMARY OF THE INVENTION

The exemplary operating environment is a computer which is assumed to have a trusted platform (TP) with a secure operating system kernel, as well as a conventional operating system. The rest of the operating system may or may not be secure. This computer runs as a client to various servers, some of which are able to engage in secure transactions. The TP has tamper-resistant registers with the property that only programs with certain hash values or signatures can access them. The TP can also produce an attestation or certificate that vouches for its security to a third party. The TP runs a program called a secure transaction module (STM) which has privileged access to registers and performs various security functions in a tamper-resistant manner. There is also a client communications manager (CCM) that manages I/O for the STM. The CCM can run under a conventional operating system, and may be subject to subversion by the user.

The TP has two special registers, XR and XW, where the STM has special access. The STM has exclusive read access to XR, meaning that it can read the value in XR and no other program can. Similarly, it has exclusive write access to XW, meaning that it can write a value into XW and no other program can. Access is typically controlled by another register that holds the hash value of the STM program.

The XR and XW registers are used to secure persistent data storage for the STM. The STM derives some cryptographic keys from XR and XW, encrypts the persistent data, and allows the CCM to store the encrypted block on a disk or on the internet or somewhere else. XW is changed frequently in order to thwart replay attacks. The value of XW is included in the encrypted block in order to make recovery possible in the event of certain hardware failures or intruder attacks. Full recovery with an out-of-date XW value requires the cooperation of the user and the licensors. If the persistent data is under the control of some content licensors, then it can be used to enforce license conditions.

DETAILED DESCRIPTION OF THE INVENTION

Figure 1:
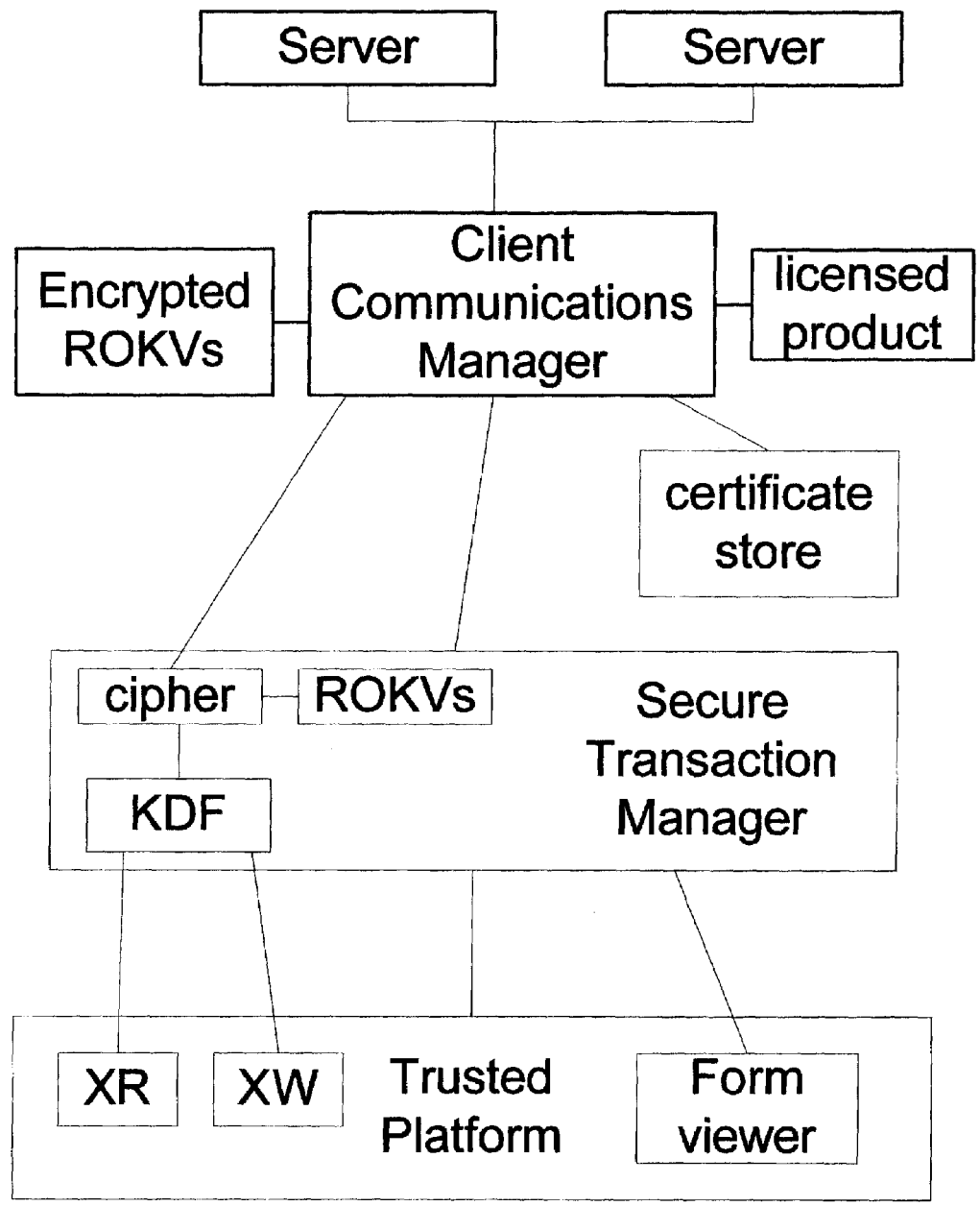
FIG. 1 shows maintaining controlled values on a TP.

In the preferred embodiment, an STM runs on a TP with XR and XW registers, as described above. The STM has exclusive read access to XR, and exclusive write access to XW. See FIG. 1.

On some TPs, there might be a 160-bit register to which the STM has exclusive read and write access, so it could serve as XR or XW. In that case it may be preferable to use the register for both, with maybe 100 bits for the XR register and 60 bits for the XW register.

The user may be able to erase XR, XW, the STM, or its hash value, or otherwise sabotage the functioning of the STM. The TP is in his possession, and he could even destroy the whole computer. The security measures are intended to make it difficult for a user to subvert the system into a faulty STM that looks like a properly working STM.

An alternate embodiment might be on a smart card, smart token, or other device.

Certificates

Certificates are commonly used to bind public keys to personal identifiers or other information. Each certificate has a subject name that identifies the certificate and the party using the certificate. For servers, it might be a business name or trademark. For users, it might be a random pseudonym. Each certificate also has an issuer name, which is just the subject name of the signer's certificate. Each certificate also has a date of issue. Each certificate has a public key for verifying signatures (corresponding to some private key for creating signatures). Each certificate indicates whether it is a root certificate, certificate authority (CA) certificate, server certificate, or end-user certificate. Each certificate specifies the STM it uses, such as "Acme STM v. 1.10+". The plus sign indicates that versions of the Acme STM later than version 1.10 are also acceptable. Each certificate has a URL that specifies where certificate chains, certificate revocation lists, and other related information can be found. A certificate might also have a physical postal address, a telephone number, an email address, or other descriptive information.

Each server certificate may declare several labels for values that can be created by cooperating users on user computers, and for which the server is taking responsibility. The server certificate will usually declare "id" and "key" for the session identifier and the shared secret key. Others, such as "account", "balance", and "music_key" can also be declared. By default, each value is unique to a given combination of server certificate and user certificate, but the label declarations can indicate that the label is inherited from the issuer certificate, or common to all users on a given computer. If it is inherited from the issuer certificate, then any user's value is shared by all the servers that similarly inherit the label. For example, a CA might declare a "money" label and then a dozen vendors might sell products through the same money account. See FIG. 4.

User (or client) certificates are described below. A certificate chain includes a certificate along with the certificate of the signing key, and the certificate of the signing key of that certificate, and so on, up to some root certificate that can be authenticated in some other way. Certificates are often transmitted as part of a certificate chain of two or three certificates. An alternate embodiment might use X.509 certificates or another certificate format.

Remotely-Owned Key Values

Servers can store data on user computers in the form of a remotely-owned key value (ROKV). Each ROKV has an owner, user, label, and value. The owner is an identifier for an owner certificate that documents a server's role in transactions. The user is an identifier for a user certificate is in use. (Some users may have more that one certificate, representing different personalities.) The label is a name for a variable that holds a value, and must match a name defined in the owner certificate. The value might be any string of bytes, and represents the data that the owner is controlling on the user's machine.

A ROKV can also have an attribute that qualifies its usage. For example, a ROKV can be locked. Once locked, an ROKV cannot be accessed by the user until the owner unlocks it.

In an alternate embodiment, some of the ROKV information might be implicit. Eg, a value might be restricted to being in some range, or being a cipher key, or being a floating point value.

Normally, the label/value pair would be bound to the particular owner and user. But if the owner certificate specifies that the label is shared by all users on the same computer, then the STM enforces that.

Figure 2:
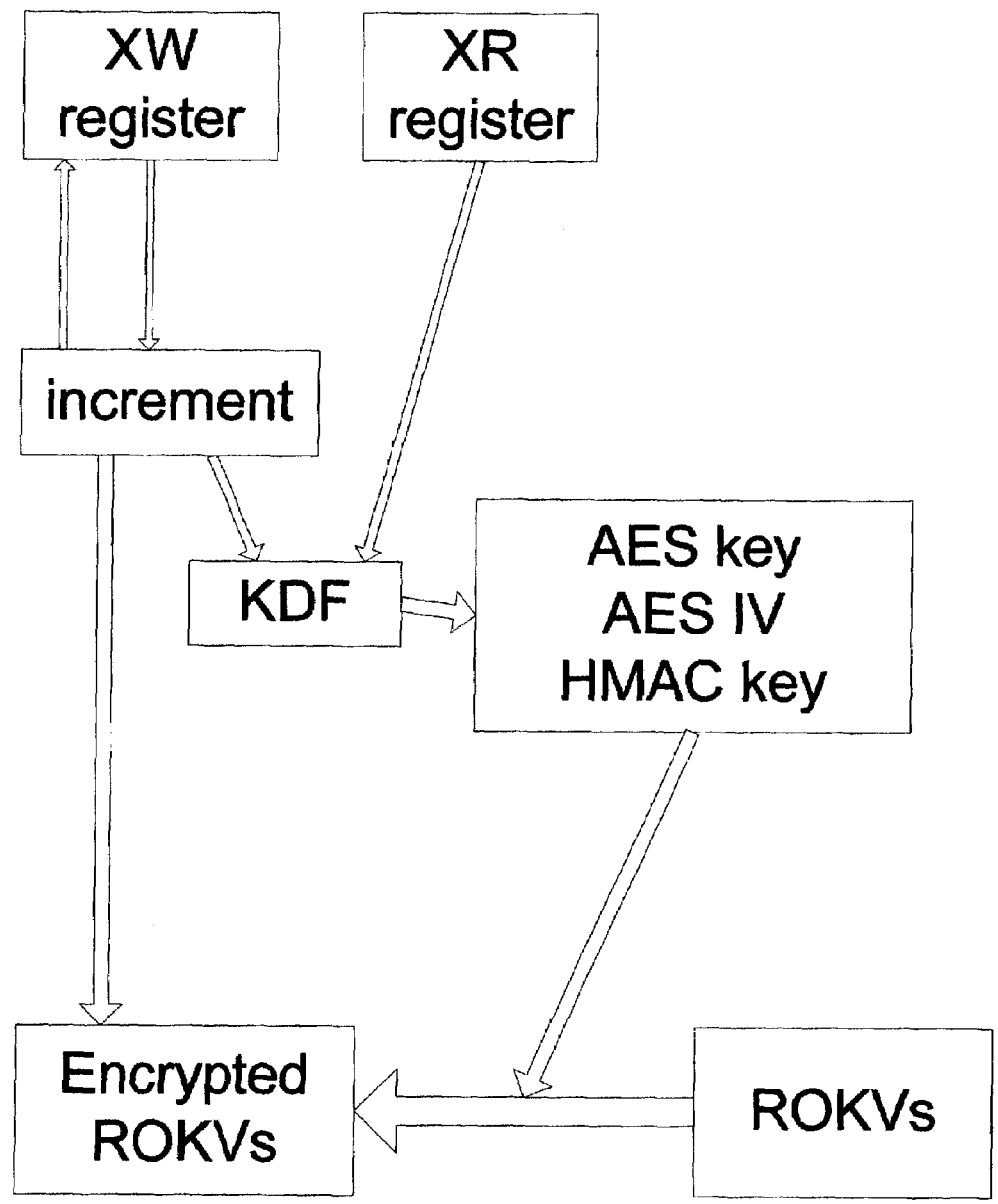
FIG. 2 shows how the controlled values are encrypted

FIG. 2 shows how the ROKVs are encrypted into EncROKVs. First the value of the XW register is incremented (or otherwise changed), and stored back in XW. Then the values of the XR and XW registers are fed into a key derivation function (KDF) such as one of those in common use based on (the cryptographic hash function) SHA-1. The KDF produces three cipher keys: an AES encryption key, an AES initialization vector (IV), and an HMAC key. The ROKVs are encrypted with AES-CBC with the encryption key and IV. The value of XW is appended. Then HMAC-SHA-1 is applied, and the resulting message authentication code (MAC) is appended. The result is EncROKVs, an encrypted ROKV block.

An alternate embodiment might use a different cipher or a different MAC. It might apply the MAC and then the cipher, instead of applying the cipher and then the MAC. It might also use a random component for the IV (and store that component in the block). Preferably, the encryption should be resistant to an adaptive chosen ciphertext attack, so that the user himself is unlikely to get significant information by forging an EncROKVs block and trying to get the STM to accept it.

Secure Transaction Manager (STM) Functions

The STM performs a number of functions, including those listed below.

Controlling access to the XR and XW registers. The STM runs on a trusted platform (TP), and the TP insures that only the STM has the right access to the XR and XW registers. When the STM is installed, the XR register is filled with a random value. That value does not need to ever be changed, although there are some security advantages to doing so occasionally. The value is only readable by the STM and is not exported. The XW register is also initialized with a new value, but it is updated on a regular basis and the value is exportable.

Communicating with the CCM. The STM may have no direct access to disk or the internet, and is limited by what can be protected by the TP. Preferably, the STM communicates with the CCM by means of an ordinary socket, but named pipes and other inter-process communication mechanisms are possible as well.

Maintaining the certificates. The STM has one or more root certificates built-in, and has access to an external database of CA, owner, and user certificates. These certificates can be stored outside the STM because they are authenticated against the root certificates.

Maintaining the ROKVs. The ROKVs are combined into one data structure, encrypted, and exported, as shown in FIG. 2. Each change to the ROKVs is accompanied by a change to XW. The value of XW can be a counter, or a random hash, or anything else that is very unlikely to repeat. It does not have to be secret. The values of XR and XW are fed into a key derivation function (KDF) to produce some cipher keys, which are then used to encrypt the ROKVs. The value of XW is also put into the encrypted block. The changes to XW protect against the keys being reused. Decryption is similar, with the existing XR and XW fed into the KDF, getting the keys for authenticating and decrypting the ROKVs.

Executing a server command set. A server command streams might be unencrypted or encrypted. The unencrypted server command stream is of the following format: (head, owner certificate, form, sig, foot). The head just marks the beginning of the stream, and includes the version number of the STM that created it. The owner certificate is the certificate of the server and includes a public key for the server. A complete certificate chain to the root may be included as well. The form is similar to an HTML form, and is intended for secure display on the user's console. The sig is a public key signature on the preceding part of the stream, using the public in the certificate. The foot just marks the end of the stream. When such a stream is input into a properly functioning STM, the STM parses it, checks the certificate or certificate chain against the internal root certificate, checks that the signature is valid, and securely displays the form using the TP.

The encrypted server command stream is of the format (head, session id, cipher nonce, body, sig, foot). The head and foot are as before. The session id must match a previously established session id, and identifies a secret key that is shared by the user and the owner. The cipher nonce has a code to indicate the cipher being used (such as AES-CBC-128 with HMAC-SHA1), and a random string of 16 bytes or so. The body is an encrypted sequence of commands. The sig is a message authentication code. When such a stream is input into a properly functioning STM, the STM parses it, looks up the session id and finds the matching owner certificate and user certificate, checks that the signature is valid, decrypts the body, and executes the commands.

Most of the server commands relate to ROKVs. Here are examples:

Substitute/$account/account/
This substitutes the value of the ROKV "account" for each occurrence of "$account" in any form. The STM checks that the server has authority to access the value.

Show/form( . . . )/
This causes the form to be displayed on a secure video display, so the user can input data with secure input devices.

Log/message/
This causes a message to be displayed on a secure video display.

Add/account/−5.1/
This adds the value −5.1 to the value of the ROKV "account". The STM checks that the server has authority to access the value.

Randomize/music_key/160/
This puts a random 160-bit value in the ROKV "music_key".

Set/account/mx501/
This puts the string value "mx501" in the ROKV "account".

Set/XW register/0x00000001234567A/
This puts a value into the XW register.

Use/PublicKeyName/PublicKeyValue/
This defines a public encryption key for the user to encrypt a form submission. It only needs to be retained as long as the form is retained.

Unlock/account/
Commands such as the above can also accompany a file to be decrypted, or other data to be processed by the STM.

Processing a user submission. When the user submits data on a form that is securely displayed by the STM, the result is a set of name/value pairs. This result is similar to the result of an HTML CGI form in the prior art. For example, a form with two inputs might be encoded as "name=Schlafly&account=501". The STM encrypts the submission, and prepares it to be sent to the server that issued the form. If a session key has been established, then the encrypted submission has the format (head, session id, cipher nonce, body, sig, foot), as with a message from the server. If no session key has been established, then the encrypted submission has the format (head, server name, ephemeral key, cipher nonce, body, sig, foot). The head, cipher nonce, sig, and foot are as above. The server name identifies the server public key. The ephemeral key is a randomly generated public key to facilitate generation of a shared secret, as in a Diffie-Hellman (DH) key exchange. (Use of RSA is also possible.) The body is an encrypted copy of the submitted form data. When the user submits the form, he is implicitly agreeing to using his computer for communication parameters with that server, and to allow the server to control the ROKVs.

Creating User Certificates

To make the STM usable, the user must create one or more user certificates. These allow the user to present a persona to servers on the internet, without unnecessarily revealing private information. A user obtains a certificate by connecting to a server, selecting a type of certificate, downloading an authenticated file into the STM, filling out the form appropriately, submitting it, and downloading the user certificate that the server issues. The submission includes an attestation that the STM is properly under the control of a recognized TP.

One computer might have several user certificates, because several people use the computer, or because certificates might be used to separate personal and work transactions, or because one certificate might have sensitive credit card account information in it, or because of other privacy considerations.

When the user installs a user certificate for himself, he gets several ROKVs. One is "random_seed", and is used by the random number generator. Entropy can then be added to the seed by servers, as well as by resources on the TP. Another ROKV is "last_gmtime", and holds the last authenticated value of Greenwich mean time received by the STM. This allows comparisons against whatever clock might be available on the TP. Another is "counter", and gets incremented by server commands. Depending on the TP, another embodiment might not need these ROKVs.

License Privileges

An owner or licensor can use ROKVs to restrict the usage of licensed content and products. For example, he might want to restrict the number of times a movie is decrypted, or restrict the time period in which a movie can be decrypted, or discard the decryption key after the license has expired, or deduct a fee from a monetary balance each time a movie is decrypted. Such restrictions can be facilitated by having ROKVs on a user TP, and letting the owner control them.

Figure 4:
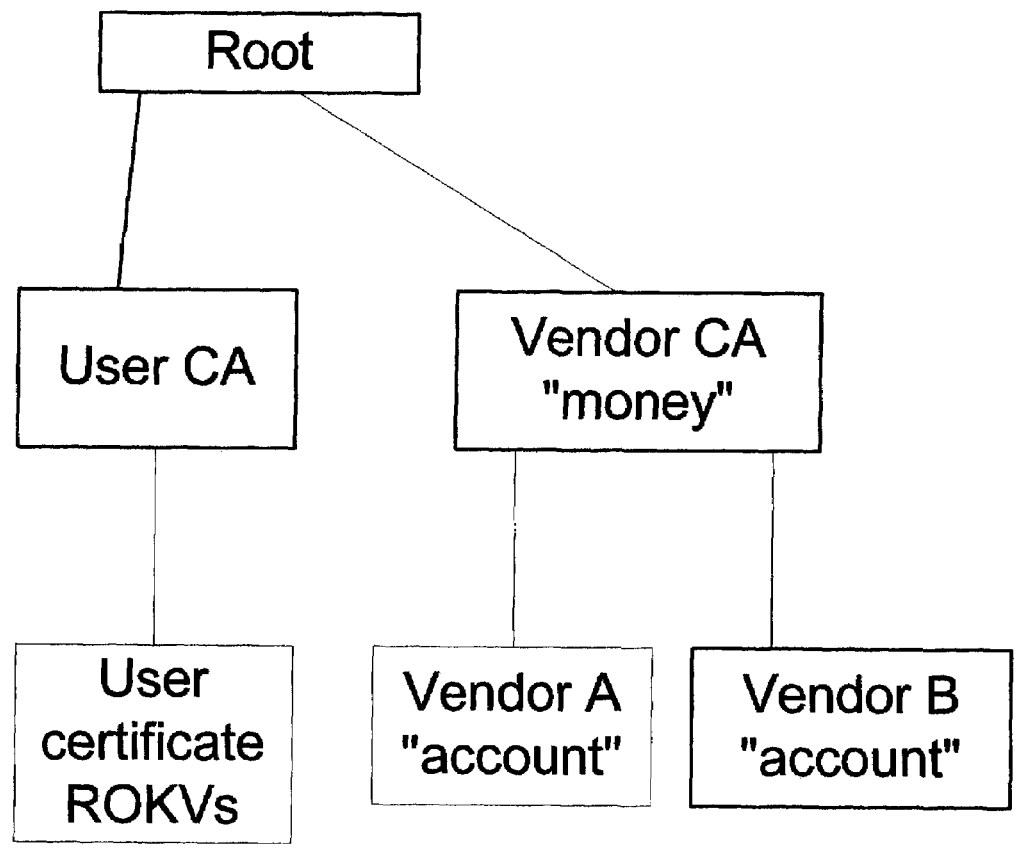
FIG. 4 shows a certificate hierarchy.

To help enforce licenses, there is a hierarchy of certified servers, as shown in FIG. 4. Each server has a certificate that has been issued by some other server, until some server ultimately has a root certificate. Each server is operated by a business entity that has signed ordinary legal contracts as well. Those contracts require that the servers use their certificates in accordance with fair business practices. For example, one server might define a label called "music_balance" in its certificate, and then issue certificates to dozens of online music vendors who share controlled values on user computers with that label. Vendors would sell to users increases in their balance, and vendors would sell music coupled with deductions in the balance. The vendors would be responsible for accounting for their sales, and abiding by their contracts regarding usage of the values under their control.

The servers run a version of the STM with additional features. The servers are allowed to extract the values that they own, and put them in a plaintext database if they want.

The system gives a method of doing business because it gives a medium for exchanging and tracking items, and for maintaining trust relationships for monetary transactions. The STM can be distributed to users with trusted platforms, and when they attest to their configurations, certificates can be issued. The user certificate certifies the platform, not the user, and very little trust needs to placed in the user.

Migrating Controlled Values

Figure 5:
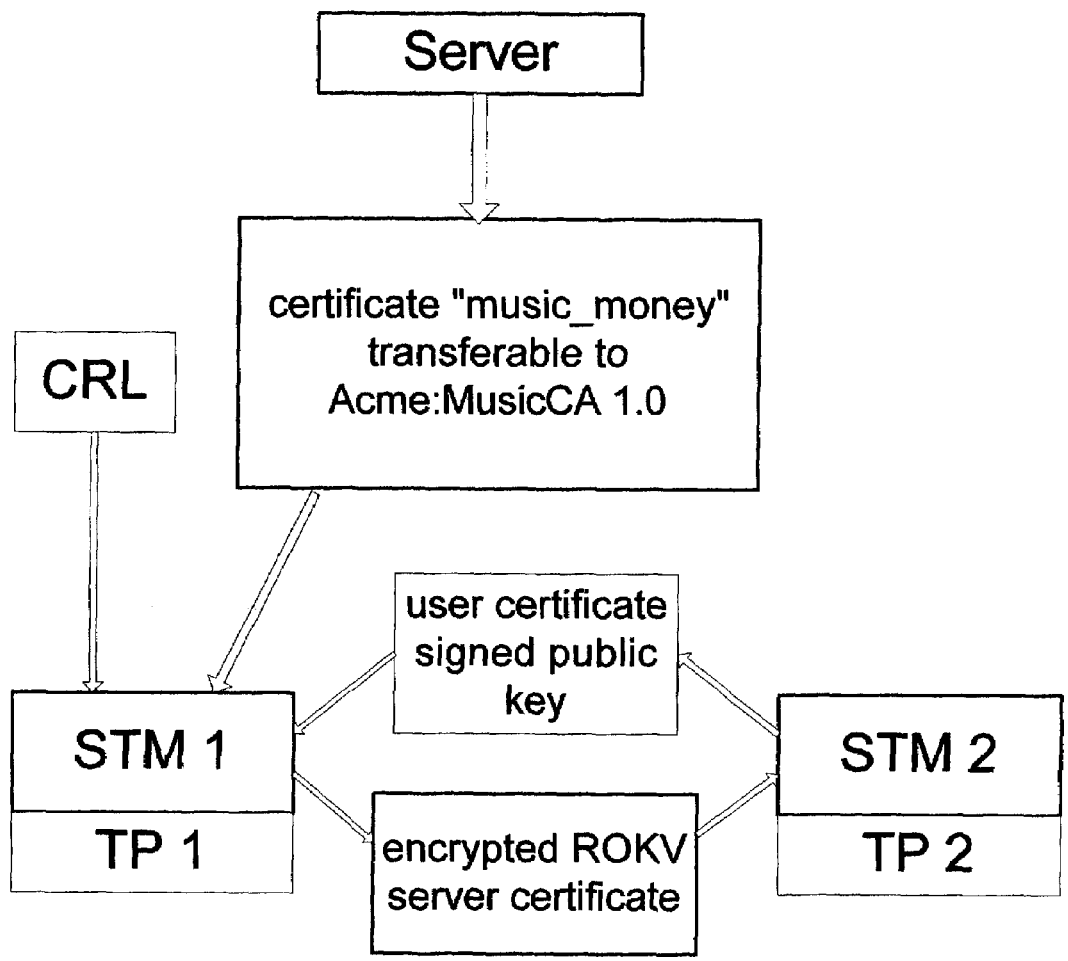
FIG. 5 shows migrating a controlled value.

Normally, the ROKVs stay on one TP (or copied to the owner in a form submission), but an owner can authorize an ROKV to be moved to another TP. FIG. 5 shows how the transfer is done. A server supplies the certificate that defines the ROKV, and it is installed by a user on a first STM running on a first TP. The user wishes to move the ROKV to a second TP, such as a smart card or laptop computer. He gets a certificate from a S™ running on the second TP, and validates that the certificate meets the minimum requirements for retaining a ROKV. Then the user has the first STM export the ROKV as an encrypted message, and send it to the second STM so it can be decrypted and loaded as a regular ROKV on that STM.

In some cases, the ROKV will represent money and copying it to another TP requires erasing it from the first TP. In other cases, the ROKV represents a secret that a user might wish to share among several regular computers and a smart card or other smart token, and the ROKV can be copied without erasing. It is the server certificate that defines whether a ROKV can be moved or copied. The server certificate also defines the possible targets for a transfer. Typically it says that any target is acceptable if it has a certificate that has been signed by a CA (that is named in the server certificate defining the ROKV).

The link between the first and second STM might be susceptible to a user attack. To guard against this, the second STM supplies a public key to the first STM so that the first STM can encrypt the ROKV for the second STM only.

When the first STM validates the certificate from the second STM, it is checking that the latter meets the security requirement of the server that defined the ROKV. This means checking that the certificate properly attests to a legitimate STM running on a TP, checking signatures up to a trusted root, checking a CRL (if necessary), and checking that the certificate's CA matches the requirement in the server's certificate.

These requirements are made manageable to the user by naming conventions. Each server and CA has a user-comprehensible name. The root and distributor of the STM might go under some name like "Acme". Other CAs and vendors would choose simple names of the sort that might be easily remembered and trademarked. These names would serve to place the certificates in a hierarchy and let the users recognize them. For example, the Acme company could create a brand name "S-Card" for smart cards that meet its security specifications, and then have a CA named S-Card issue certificates for those smart cards (once they attest that they have a TP and show that they meet the requirements). Then users might understand that they might want to buy an Acme:S-Card certified smart card. Furthermore, other vendors can advertise that their key values are transferable to and from Acme:S-Card smart cards.

Recovering from Irregularities

The preferred embodiment has features that allow it to adapt and recover from many bugs, mistakes, hardware failures, and malicious attacks.

One potential problem is that frequent changes to the ROKVs require frequent changes to the XW register. The ROKVs are encrypted using the XR and XW registers, and stored as a block in a possibly insecure location. The user can guard against loss or corruption of that block by storing backups (ie, copies) in other locations. In rare cases, he might lose the current block, and his most recent backup block was created with a different value in the XW register.

Figure 3:
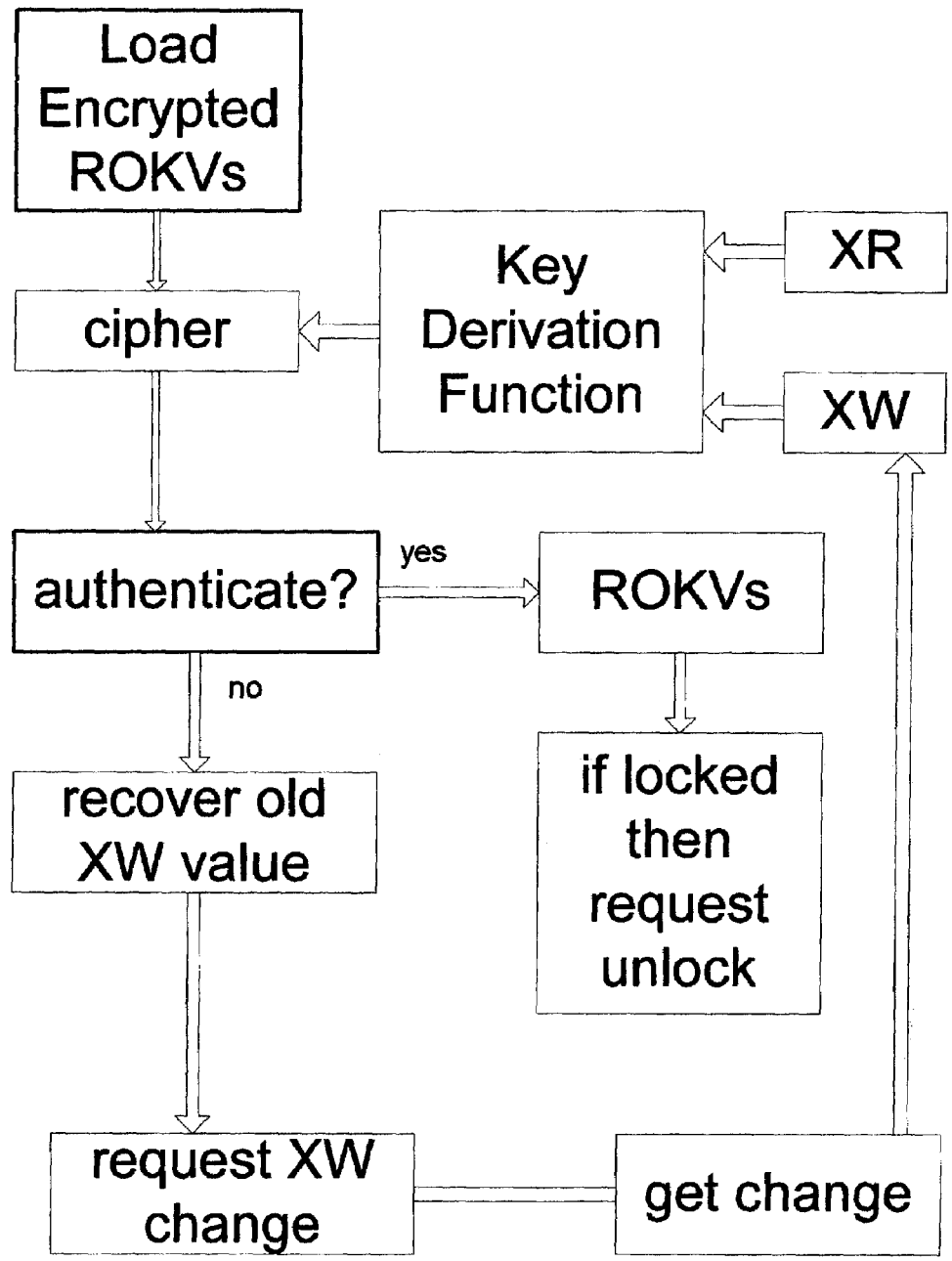
FIG. 3 shows recovering the controlled values.

In that case, the STM refuses to load the backup block normally because of the XW mismatch. The prior value of the XW register is in the block, and the STM can be configured to retrieve that value and store it in the XW register, so that the prior ROKVs can be recovered. The preferred method is shown in FIG. 3.

The user notifies his CA that he has had a hardware failure or intruder attack, and that he needs to restore a previous XW value. He does this by filling out a form and providing whatever information the CA requires. The CA check his policies, and grants permission (in the form of an STM command) to change the XW. The CA also sends a command to put a lock on all the ROKVs. A lock on a ROKV is just a flag limiting access to the ROKV. To use those ROKVs as before, the user must then submit requests to each owner for a command to unlock the ROKVs under his control. Again, this involves filling out a form and providing whatever information is required.

The XR register is modified infrequently. Changing XR results in all previous backups being unreadable. This may be desirable on an occasional basis but is not necessary as long is the TP is securely protecting it. If all backups are lost, then the user may be able to persuade the vendors to reinstate his accounts, but there is no assurance of that.

Upgrading and Extending the STM

It is expected that the STM will have to be regularly upgraded in order to fix bugs, close vulnerabilities, recognize new secure hardware devices, add commands and options, etc. An upgrade may lock out some users who are believed to be operating in an insecure environment.

Server certificates can also be upgraded. For example, a potato vendor might use the subject name "Famous Potatoes 1.0". Later, when it wants to change its public key, declare additional labels, and require a newer version of the STM, it obtains a certificate in the name of "Famous Potatoes 1.1". The vendor might just use the new certificate for new customers, or it might migrate existing customers by asking them to submit the ROKVs to the vendor, establish a connection with the new certificate, and let the vendor re-issue those ROKVs under the control of the new certificate.

Certificates might also be revoked, and policies for checking a certificate revocation list (CRL) might be changed.

The invention has been described in its preferred embodiments, but many changes and modifications may become apparent to those skilled in the art without departing from the spirit of the invention. The scope of the invention should be determined by the appended claims and their legal equivalents.

I claim:

1. A method for maintaining remote data, the method comprising the following steps, in any suitable order:
    running an authenticated program on a trusted platform;
    binding a first register and a second register on said trusted platform to said authenticated program;
    storing a random secret in said first register, and insuring that only said authenticated program can read said random secret while said binding is in effect;
    storing a unique integer value in a second register on said platform, and insuring that only said authenticated program can write to said second register while said binding is in effect;
    deriving cipher keys from said first register and said second register;
    maintaining exclusive access to a persistent data structure;
    protecting said persistent data structure with said cipher keys;
    parsing said persistent data structure into a list of controlled values, and modifying said controlled values based on commands from remote owners;
    accepting a command from an authenticated server;
    changing one of said controlled values, pursuant to said command;
    changing said unique value in said second register to a distinct value;
    loading said persistent data structure, and extracting a previously-saved second register value;
    comparing said previously-saved second register value against the current value of said second register; and
    refusing to decrypt if the values do not match.

2. The method of claim 1, further comprising:
    loading an encrypted copy of said persistent data structure;
    recovering a previous value of said second register;
    obtaining permission to write said previous value into said second register;
    locking said controlled values; and
    requesting permission to unlock said controlled values.

3. The method of claim 1, further comprising:
    accessing an authenticated time value; and
    storing said time value as one of said controlled values.

4. The method of claim 1, further comprising:
    accessing a database of certificates;
    validating said certificates against a root certificate; and
    associating each of said controlled values to one or more of said certificates.

5. The method of claim 1, further comprising:
    making a license privilege contingent on one of said controlled values.

6. The method of claim 1, further comprising:
    using a form to securely obtain user input and acknowledgement.

7. The method of claim 1, further comprising:
    upgrading said authenticated program to a modified program;
    authenticating said modified program;
    transferring contents of said first register and said second register; and
    moving said controlled values to be under control of said modified program.

8. The method of claim 4, further comprising:
    sharing said controlled values, based on scopes defined in said certificates.

9. The method of claim 1, further comprising:
    using a plurality of certificates to alleviate privacy concerns, where each said certificate corresponds to a key on said trusted platform.

10. A computer-readable medium storing a computer program implementing the method of claim 1.

11. A system for maintaining remotely-controlled data, comprising:
    a processor;
    a trusted platform running an authenticated program;
    a first register in said trusted platform, holding a random secret that only said authenticated program can read;
    a second register in said trusted platform, holding a unique value that only said authenticated program can write and that is readable by other programs;
    a cipher key derived from said first register and said second register;
    a persistent data structure protected with said cipher key;
    a list of controlled values, parsed from said persistent data structure, and modified based on commands from remote owners;
    means to accept a command from an authenticated server;
    means to change one of said controlled values, pursuant to said command;
    means to a change said unique value in said second register to a distinct value;
    means to load said persistent data structure, and extracting a previously-saved second register value;
    means to compare said previously-saved second register value against the current value of said second register; and
    means to refuse to decrypt if the values do not match.

* * * * *